(12) United States Patent
Ohori et al.

(10) Patent No.: US 10,644,552 B2
(45) Date of Patent: May 5, 2020

(54) BRUSHLESS MOTOR

(71) Applicant: MITSUBA Corporation, Gunma (JP)

(72) Inventors: Ryo Ohori, Gunma (JP); Naoki Shioda, Gunma (JP)

(73) Assignee: MITSUBA Corporation, Gunma (JP)

(*) Notice: Subject to any disclaimer, the term of this patent is extended or adjusted under 35 U.S.C. 154(b) by 49 days.

(21) Appl. No.: 15/739,754

(22) PCT Filed: Jun. 29, 2016

(86) PCT No.: PCT/JP2016/069314
§ 371 (c)(1),
(2) Date: Dec. 25, 2017

(87) PCT Pub. No.: WO2017/002873
PCT Pub. Date: Jan. 5, 2017

(65) Prior Publication Data
US 2018/0198333 A1 Jul. 12, 2018

(30) Foreign Application Priority Data
Jun. 29, 2015 (JP) .................. 2015-130241

(51) Int. Cl.
*H02K 1/27* (2006.01)
*H02K 21/14* (2006.01)
*H02K 29/03* (2006.01)

(52) U.S. Cl.
CPC ........... *H02K 1/2773* (2013.01); *H02K 1/278* (2013.01); *H02K 21/14* (2013.01); *H02K 29/03* (2013.01)

(58) Field of Classification Search
CPC ........ H02K 1/2773; H02K 1/27; H02K 1/272; H02K 1/278; H02K 1/274; H02K 1/2753; H02K 21/14; H02K 9/03
(Continued)

(56) References Cited

U.S. PATENT DOCUMENTS 2,792,512 A * 5/1957 Koch .................... H02K 1/185
310/415
4,417,167 A * 11/1983 Ishii ......................... H02K 7/04
310/156.26
(Continued)

FOREIGN PATENT DOCUMENTS

JP H08111968 4/1996
JP 2001045682 2/2001
(Continued)

OTHER PUBLICATIONS

"International Search Report (Form PCT/ISA/210) of PCT/JP2016/069314", dated Sep. 13, 2016, with English translation thereof, pp. 1-4.
(Continued)

*Primary Examiner* — Jermele M Hollington
*Assistant Examiner* — Ahmed Elnakib
(74) *Attorney, Agent, or Firm* — JCIPRNET

(57) ABSTRACT

A rotor of a brushless motor includes permanent magnets formed on the outer circumference of a rotating shaft to have a fan shape in an axial cross section, magnetized from the inner radial surface toward the outer radial surface, and arranged at even intervals so that magnetic poles of the outer radial surfaces are disposed alternately with respect to the polarities thereof in the circumferential direction. The outer radial surface of each of the permanent magnets includes a center of curvature on a line segment connecting a center point in the circumferential width on the outer radial surface with the axial center of the rotating shaft, and formed as a cylindrical surface having a radius of curvature smaller than the distance of the line segment. Each of the permanent magnets is magnetized in a parallel orientation so that the orientation of magnetized magnetic flux is parallel to the line segment.

5 Claims, 10 Drawing Sheets

(58) Field of Classification Search
USPC ............ 310/156.38, 156.01, 156.23, 156.28,
310/156.31, 156.43, 156.47, 156.68,
310/216.055, 216.069, 216.071, 216.072,
310/216.073, 49.39
See application file for complete search history.

(56) References Cited

U.S. PATENT DOCUMENTS

| | | | | |
|---|---|---|---|---|
| 6,717,315 B1* | 4/2004 | Tajima | ................... | H02K 1/278 310/156.45 |
| 8,018,104 B2* | 9/2011 | Yagai | ................... | H02K 3/522 310/71 |
| 9,515,528 B2* | 12/2016 | Yamaguchi | ............ | H02K 21/14 |
| 2002/0067092 A1* | 6/2002 | Crapo | ................... | H02K 1/278 310/156.47 |
| 2002/0140308 A1* | 10/2002 | Inayama | ................ | H02K 1/278 310/156.47 |
| 2005/0093390 A1* | 5/2005 | Komuro | ................ | H02K 1/278 310/156.43 |
| 2005/0264122 A1* | 12/2005 | Domeki | ................ | H02K 1/278 310/156.46 |
| 2006/0238058 A1* | 10/2006 | Koide | ................... | H02K 1/278 310/156.55 |
| 2009/0127960 A1* | 5/2009 | Kawamura | ............ | H02K 1/278 310/156.43 |
| 2010/0225192 A1* | 9/2010 | Jeung | ................... | H02K 1/2733 310/156.43 |
| 2011/0241467 A1* | 10/2011 | Fujioka | ................. | H02K 1/146 310/156.08 |
| 2012/0104905 A1* | 5/2012 | Prudham | ................ | H02K 1/146 310/68 B |
| 2013/0088114 A1* | 4/2013 | Yamashita | ............. | H02K 1/278 310/156.38 |
| 2014/0359969 A1* | 12/2014 | Kim | ........................ | H02K 1/278 15/412 |
| 2018/0198333 A1* | 7/2018 | Ohori | ..................... | H02K 21/14 |

FOREIGN PATENT DOCUMENTS

| | | |
|---|---|---|
| JP | 2001275285 | 10/2001 |
| JP | 2002262533 | 9/2002 |
| JP | 2002272034 | 9/2002 |
| JP | 2005253146 | 9/2005 |
| JP | 2006042414 | 2/2006 |
| JP | 2012085527 | 4/2012 |
| JP | 5714189 | 5/2015 |

OTHER PUBLICATIONS

Office Action of Japan Counterpart Application, with English translation thereof, dated Feb. 25, 2020, pp. 1-8.

* cited by examiner

BRUSHLESS MOTOR

CROSS-REFERENCE TO RELATED APPLICATION

This application is a 371 application of the International PCT application serial no. PCT/JP2016/069314, filed on Jun. 29, 2016, which claims the priority benefits of Japan Patent Application No. 2015-130241, filed on Jun. 29, 2015. The entirety of each of the above-mentioned patent applications is hereby incorporated by references herein and made a part of this specification.

TECHNICAL FIELD

The present disclosure relates to an inner rotor type brushless motor.

Priority is claimed on Japanese Patent Application No. 2015-130241, filed Jun. 29, 2015, the content of which is incorporated herein by reference.

BACKGROUND ART

As a brushless motor, there is a so-called inner rotor type motor having a stator on which a coil is wound and a rotor rotatably provided in a radial inside of the stator. A plurality of permanent magnets are disposed on an outer circumferential surface of the rotor of this type so that magnetic poles thereof are disposed alternately in a circumferential direction. Meanwhile, the stator is configured with a cylindrical stator housing and a cylindrical stator core which is engaged with and fixed to an inner circumferential surface of the stator housing. For example, the stator core is formed in a cylindrical shape by stacking electromagnetic steel plates, and windings are wound around teeth of the stator core.

In this type of brushless motor, to improve magnetic characteristics of the rotor, it is known to change a magnetic orientation of each segment type permanent magnet from a radial orientation (an orientation in a direction in which a magnetic field toward the stator is diffused toward the stator) to a parallel orientation (an orientation in which the magnetic fields toward the stator are parallel to each other toward the stator) or a reverse radial orientation (an orientation in which the magnetic field toward the stator converges toward the stator) (for example, refer to Patent Document 1).

CITATION LIST

Patent Literature

[Patent Document 1]

Japanese Unexamined Patent Application Publication No. 2006-42414

SUMMARY OF DISCLOSURE

Technical Problem

However, there is a limit to improving the magnetic characteristics of the rotor only by the magnetic orientation of the permanent magnet. Further, when it is intended to simply improve the magnetic characteristics of the rotor, the permanent magnets are increased in size, and thus there is a problem that the motor as a whole is increased in size. In addition, cost of the permanent magnet is increased, and there is a possibility of the manufacturing cost of the motor increasing.

Accordingly, the disclosure provides a brushless motor which is capable of improving motor characteristics while reducing size and cost thereof.

Solution to Problem

According to a first aspect of the disclosure, there is provided a brushless motor, which is an inner rotor type brushless motor, including a rotating shaft, a cylindrical stator concentrically disposed with respect to the rotating shaft and on which a coil is wound, and a rotor integrally formed with the rotating shaft and disposed on an inner circumferential side of the stator with a gap, wherein the rotor includes a plurality of segment type permanent magnets formed on an outer circumference of the rotating shaft to have a fan-shaped axial cross section, magnetized from an inner radial surface toward an outer radial surface and disposed at regular intervals so that magnetic poles of the outer radial surfaces are alternately disposed in the circumferential direction, and the outer radial surface of each of the permanent magnets has a center of curvature on a line segment connecting a center point of a circumferential width on the outer radial surface and an axial center of the rotating shaft and is formed as a cylindrical surface having a radius of curvature smaller than a distance of a line segment connecting the center point of the circumferential width on the outer radial surface and the axial center of the rotating shaft, and each of the permanent magnets is magnetized in a parallel orientation so that a direction of a magnetized magnetic flux is in parallel with the line segment connecting the center point of the circumferential width on the outer radial surface and the axial center of the rotating shaft.

As described above, since a magnetic orientation of each of the permanent magnets is the parallel orientation, a permeance coefficient of the permanent magnet can be increased, and thus effective magnetic flux can be increased as compared with a radial orientation.

Further, by setting the center of curvature and the radius of curvature of the outer radial surface of each permanent magnet as described above, it is possible to efficiently improve the permeance coefficient and the effective magnetic flux of the permanent magnet while suppressing an increase in a size of the permanent magnet. Further, since a thickness of both end portions of the permanent magnet in the circumferential direction can be made thinner than a thickness of an intermediate portion thereof in the circumferential direction, it helps to reduce togging torque.

Accordingly, it is possible to improve motor characteristics while reducing a size and cost of the brushless motor.

According to a second aspect of the disclosure, in the brushless motor according to the first aspect of the disclosure, the stator may include a stator core, and the stator core may include a ring yoke portion formed in a regular polygonal cylindrical shape and a tooth portion configured to protrude radially inward from a central position of a circumferential width of an inner circumference of each flat portion of the ring yoke portion corresponding to a side of the regular polygonal shape and on which the coil is wound.

Due to such a configuration, it is possible to secure a large storage space (slot space) of the coil without increasing an arrangement space of the stator. Therefore, it is possible to increase density (space factor) of the winding wound around each tooth portion, and it is possible to improve the motor characteristics while miniaturizing the brushless motor.

According to a third aspect of the disclosure, in the brushless motor according to the first aspect or the second aspect of the disclosure, the permanent magnet may be a ferrite magnet.

Using the ferrite magnet as described above helps to solve a problem of high temperature demagnetization when a neodymium (rare earth) permanent magnet is used. Also, as compared to the neodymium permanent magnet, manufacturing cost can be reduced. Therefore, it is possible to secure necessary motor characteristics while suppressing a cost increase.

According to a fourth aspect of the disclosure, in the brushless motor according to any one of the first to third aspects of the disclosure, a cylindrical magnet cover formed of a nonmagnetic material may be fitted to outer circumferences of the permanent magnets arranged in the circumferential direction.

By fitting the magnet cover to the outer circumference of the permanent magnet as described above, it is possible to prevent separation of the permanent magnet, attachment of dust and damage to the permanent magnet. The magnet cover can be fixed to the outer circumference of the permanent magnet by adhesion, press-fitting, crimping or the like.

According to a fifth aspect of the disclosure, in the brushless motor according to any one of the first to fourth aspects of the disclosure, a cylindrical rotor core may be fitted and fixed to the outer circumference of the rotating shaft, the permanent magnets may be disposed on an outer circumference of the rotor core, and an axial maximum thickness of each of the permanent magnets may be set to be equal to or greater than an axial thickness of the rotor core.

Due to such a configuration, the space occupied by the rotor core can be set to be equal to the conventional one and the thickness of the permanent magnet in the radial direction can be sufficiently secured. Therefore, it is possible to obtain desired motor characteristics while preventing the size increase of the rotor even when the permanent magnet having a small magnetic saturation value is used.

According to a fifth aspect of the disclosure, in the brushless motor according to any one of the first to fourth aspects of the disclosure, an axial length of the permanent magnet may be set to be longer than an axial length of the stator.

Due to such a configuration, even when the maximum thickness of each permanent magnet in the radial direction is limited, it is possible to secure a magnetic flux of a magnitude necessary for maintaining the motor performance by setting the axial length of the permanent magnet to be longer than the axial length of the stator.

Advantageous Effects of Disclosure

According to the above-described brushless motor, since the magnetic orientation of each permanent magnet is the parallel orientation, the permeance coefficient of the permanent magnet can be increased, and thus the effective magnetic flux can be increased as compared with the radial orientation.

Also, by setting the center of curvature and the radius of curvature of the outer radial surface of each permanent magnet as described above, it is possible to efficiently improve the permeance coefficient and the effective magnetic flux of the permanent magnet while suppressing the increase in the size of the permanent magnet. Further, since the thickness of both end portions of the permanent magnet in the circumferential direction can be made thinner than the thickness of the intermediate portion thereof in the circumferential direction, it helps to reduce the cogging torque.

Accordingly, it is possible to improve the motor characteristics while reducing the size and cost of the brushless motor.

DESCRIPTION OF EMBODIMENTS

Hereinafter, an embodiment of the disclosure will be described with reference to the drawings.

(Motor with Speed Reducer)

Figure 1:
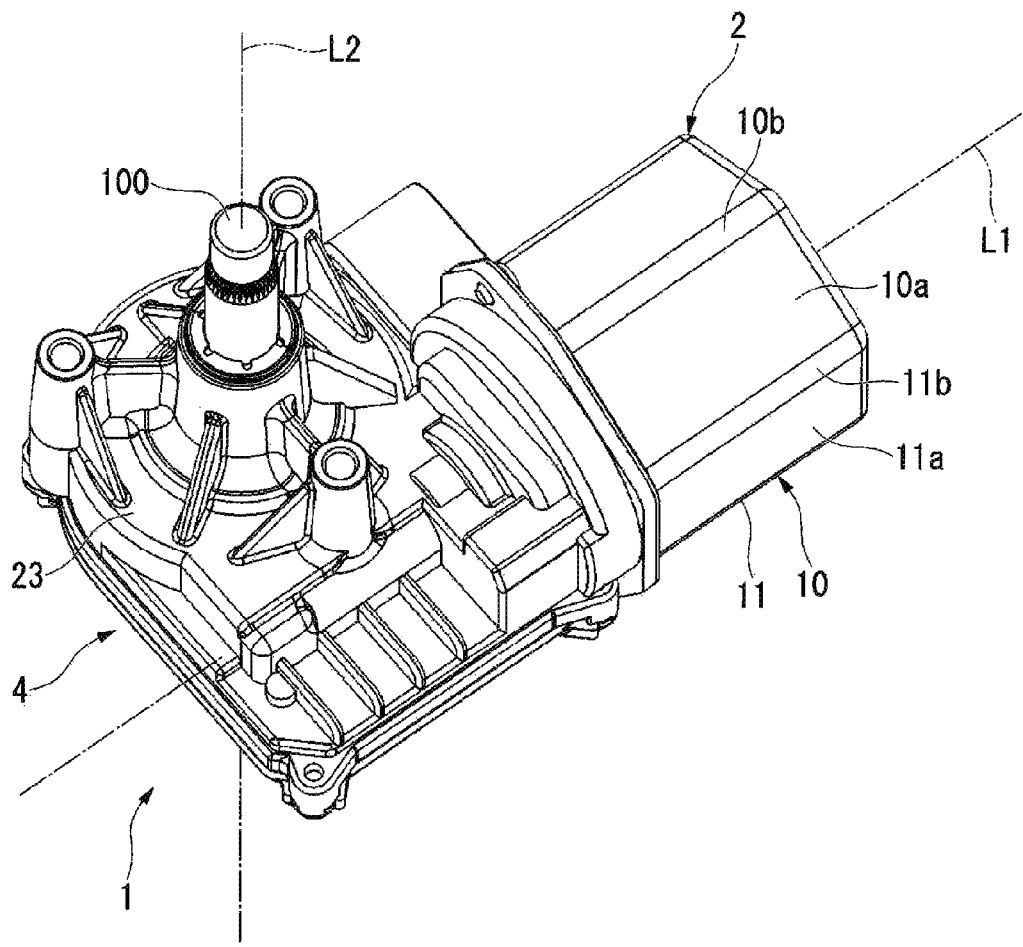
FIG. 1 is an external perspective view illustrating a configuration of a motor with a speed reducer according to an embodiment of the disclosure.
Figure 2:
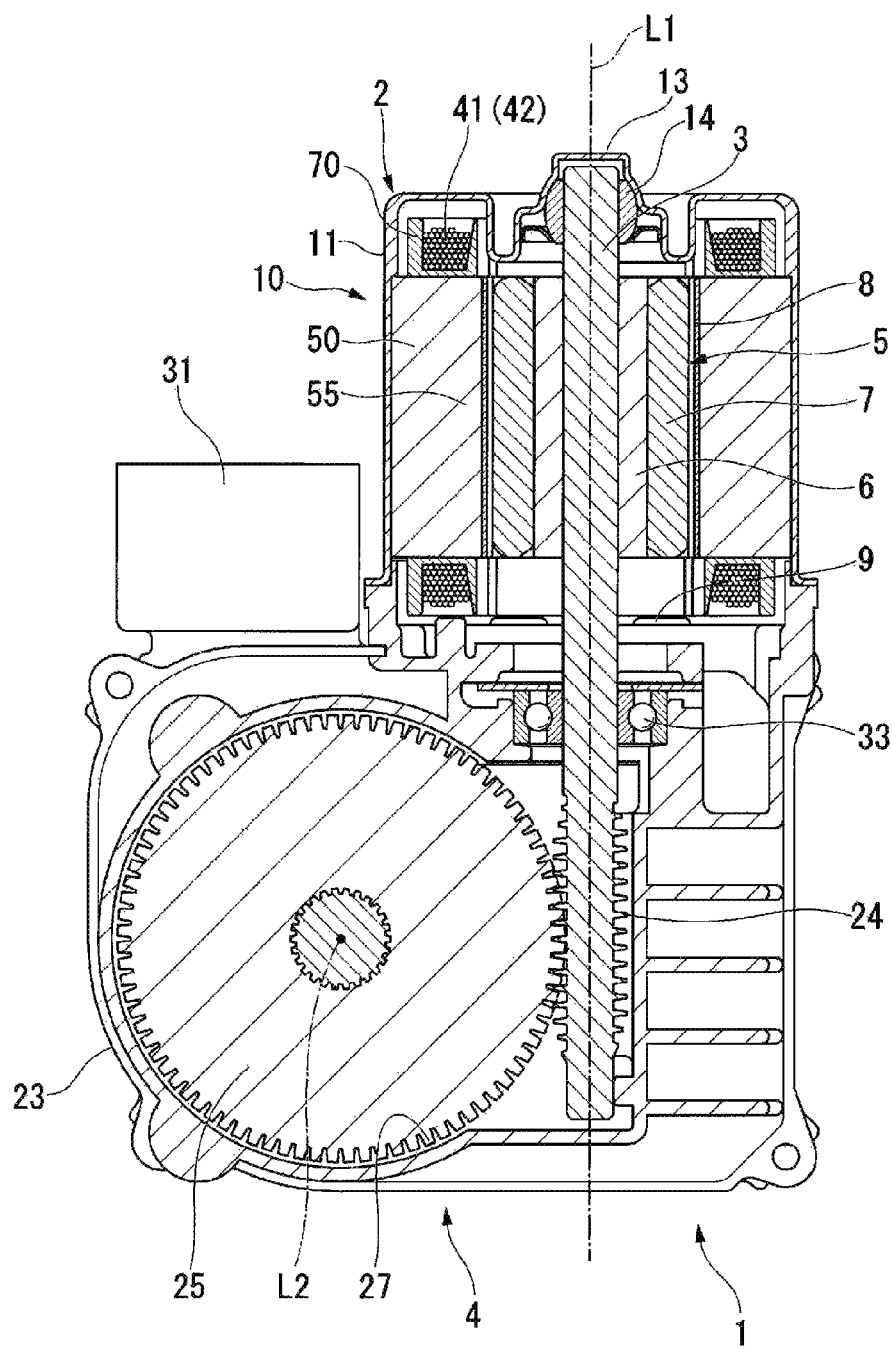
FIG. 2 is a cross-sectional view illustrating the configuration of the motor with the speed reducer according to the embodiment of the disclosure.

FIG. 1 is an external perspective view illustrating a configuration of a motor with a speed reducer to which a brushless motor according to an embodiment of the disclosure is applied. FIG. 2 is a cross-sectional view illustrating the motor with the speed reducer. Further, in the following description, an axial direction of a rotating shaft 3 is simply referred to as an axial direction, a circumferential direction of the rotating shaft 3 is simply referred to as a circumferential direction, and a radial direction of the rotating shaft 3 is simply referred to as a radial direction.

As illustrated in FIGS. 1 and 2, for example, the motor 1 with the speed reducer serves as a drive source of electric components (for example, a power window, a sunroof, an electric seat, and so on) mounted in a vehicle and includes a brushless motor 2 and a worm gear speed reducer 4 connected to the rotating shaft 3 of the brushless motor 2.

(Brushless Motor)

The brushless motor 2 is an inner rotor type brushless motor including the rotating shaft 3, a cylindrical stator 10 concentrically disposed with respect to the rotating shaft 3, a rotor 5 integrated with the rotating shaft 3 and disposed on an inner circumferential side of the stator 10 with a gap.

(Stator)

The stator 10 includes a stator housing 11 forming an outer shell of the stator 10, a stator core 50 disposed in the stator housing 11, and a coil 41 wound around the stator core 50.

(Stator Housing)

The stator housing 11 is formed of a metallic material to have a bottomed hexagonal cylindrical shape having substantially rounded corners in section. Inside the stator housing 11, the stator core 50 having a plurality of coils 41 formed thereon is fixedly disposed in the circumferential direction by fixing means such as adhesion or press fitting.

(Stator Core)

Figure 3:
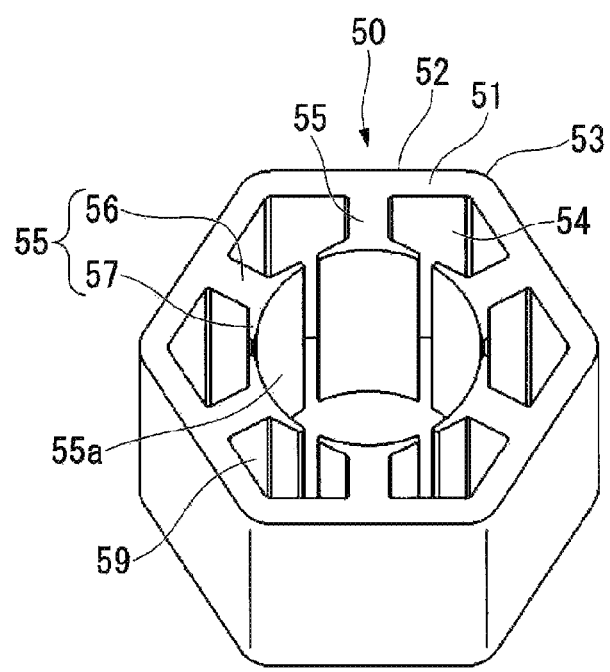
FIG. 3 is a perspective view illustrating a configuration of a stator core according to the embodiment of the disclosure.

FIG. 3 is an external perspective view of the stator core.

As illustrated in FIG. 3, the stator core 50 is formed in a hexagonal cylindrical shape having substantially rounded corners in section which can be press-fitted into the stator housing 11 (refer to FIG. 2). The stator core 50 includes a ring yoke portion 51 formed in a hexagonal cylindrical shape having substantially rounded corners in section, and a plurality of (six in the embodiment) tooth portions 55 protruding radially inward from a central position of a circumferential width of an inner circumference of each flat portion 52 of the ring yoke portion 51 corresponding to a side of the hexagonal shape. The flat portion 52 of the ring yoke portion 51 is a portion between adjacent corner portions 53. If necessary, a tapered portion 54 is provided on an inner circumferential side of the corner portion 53 to have a sufficient path width for forming a magnetic path in the corner portion 53. As illustrated in FIG. 2, in the stator core 50, a winding 42 is wound around the tooth portion 55 via an insulator 70 formed of a resin, and a plurality of (six in the embodiment) coils 41 are formed.

The tooth portion 55 is configured with a winding drum portion 56 which extends in the radial direction and on which the winding 42 is wound and a flange portion 57 which extends from a radially inner tip end of the winding drum portion 56 in the circumferential direction. The flange portion 57 is integrally formed with the winding drum portion 56. The flange portion 57 is formed so that a radially inner circumferential surface is formed in a circular arc surface. A slot 59 in which the winding 42 of the coil 41 is disposed is provided between the adjacent tooth portions 55. The coil 41 of each phase generates a rotating magnetic field for rotating the rotor 5 by power supply from an external power source.

As illustrated in FIG. 2, a bearing housing 13 is formed to protrude from a lower portion of the stator housing 11. A bearing 14 for rotatably supporting one end of the rotating shaft 3 is fitted into the bearing housing 13. An opening of the stator housing 11 (on a side opposite to a side in which the bearing housing 13 is provided) is connected to an opening of the gear housing 23. The other end of the rotating shaft 3 is inserted into the gear housing 23. In the vicinity of the opening of the gear housing 23, a bearing housing is provided, and a bearing 33 is fitted and fixed to the bearing housing. An intermediate portion of the rotating shaft 3 in a lengthwise direction is rotatably supported by the bearing 33.

(Rotor)

The rotor 5 includes a cylindrical rotor core 6 press-fitted into an outer circumference of the rotating shaft 3, a plurality of segment type permanent magnets (rotor magnets) 7 provided on an outer circumference of the rotor core 6, and a magnet cover 8 formed of a nonmagnetic material (formed of stainless steel or the like) fitted to an outer circumference of the permanent magnet 7. The magnet cover 8 serves to hold the permanent magnet 7 at a desired position on the outer circumference of the rotor core 6 and to prevent attachment of dust and damage to the permanent magnet 7.

(Permanent Magnet)

Figure 5A:
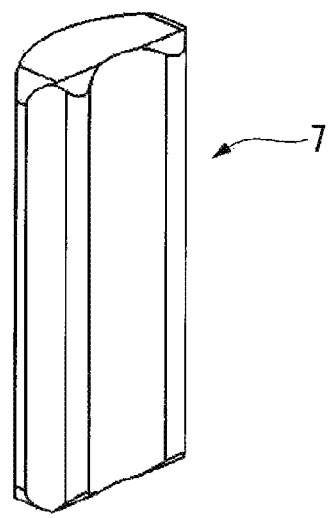
FIG. 5A is a perspective view of a permanent magnet according to the embodiment of the disclosure.
Figure 5B:
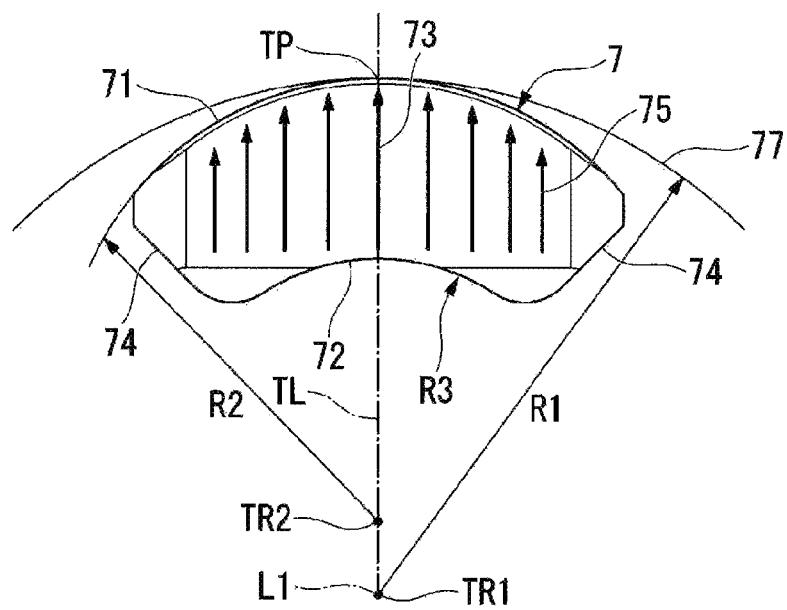
FIG. 5B is a view illustrating a parallel magnetic orientation of the permanent magnet according to the embodiment of the disclosure.
Figure 5C:
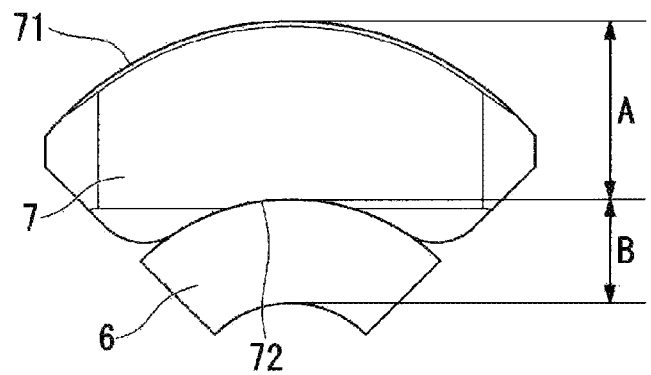
FIG. 5C is a view illustrating a dimensional relationship between the permanent magnet and a rotor core according to the embodiment of the disclosure.

FIG. 5A is a configuration view of the permanent magnet and a perspective view of a single permanent magnet, FIG. 5B is a view illustrating a parallel magnetic orientation of the permanent magnet, and FIG. 5C is a view illustrating a dimensional relationship between the permanent magnet and the rotor core.

The permanent magnet 7 is configured with a ferrite magnet, and as illustrated in FIGS. 5A to 5C, each permanent magnet 7 is formed so that a cross section thereof in the axial direction has a fan shape. The permanent magnet 7 is magnetized from an inner radial surface 72 toward an outer radial surface 71, and magnetic poles of the outer radial surfaces 71 are alternately arranged at regular intervals in the circumferential direction. The magnet cover 8 is fitted to an outer circumference of the permanent magnet 7 arranged in the circumferential direction.

As illustrated in FIG. 5B, the outer radial surface 71 of each permanent magnet 7 has a center of curvature TR2 on a line segment TL connecting a center point TP of a circumferential width on the outer radial surface 71 and an axial center L1 of the rotating shaft 3 and is formed as a cylindrical surface having a radius of curvature R2 smaller than a distance of the line segment TL connecting the center point TP of the circumferential width on the outer radial surface 71 and the axial center L1 of the rotating shaft 3. That is, each of the permanent magnets 7 is formed to be located on an inner circumferential side of an imaginary cylindrical surface 77 in which the line segment TL connecting the center point TP of the circumferential width on the outer radial surface 71 and the axial center L1 of the rotating shaft 3 is taken as a radius R1 and the axial center L1 of the rotating shaft is taken as a center TR1.

Further, magnetized in a parallel orientation so that a direction of a magnetized magnetic flux 75 is in parallel with the line segment TL connecting the center point TP of the circumferential width on the outer radial surface 71 and the axial center L1 of the rotating shaft 3. Also, as illustrated in FIG. 5C, a maximum thickness A of the permanent magnet 7 in the radial direction is set to be equal to or larger than a thickness B of the rotor core 6 in the radial direction.

The rotating shaft 3, the rotor core 6, the permanent magnet 7 and the magnet cover 8 are integrally formed, and the rotating magnetic field of the coil 41 acts on the permanent magnet 7, and thus the rotating shaft 3 rotates.

(Worm Gear Speed Reducer)

As illustrated in FIG. 2, in addition to the gear housing 23, the worm gear speed reducer 4 has a worm 24 accommodated in the gear housing 23 and a worm wheel 25 engaged with the worm 24. In the gear housing 23, an accommodating space 27 for accommodating the worm 24 and the worm wheel 25 is formed. The other end of the rotating shaft 3 is inserted into the accommodating space 27 of the gear housing 23 while being supported by the bearing 33. The worm 24 is provided on the other end side of the rotating shaft 3 to integrally rotate.

An output shaft 100 is provided on the worm wheel 25 engaged with the worm 24 in a direction orthogonal to the rotating shaft 3 of the brushless motor 2. Additionally, as the output shaft 100 rotates, various electrical components (power window, sunroof, electric seat, and so on) are driven.

In the brushless motor 2, an outer circumferential surface of the stator housing 11 forming the stator 10 is formed in a hexagonal shape having corner portions 11b and a flat portion 11a. Further, the stator core 50 forming the stator 10 has a flat portion 52 and a flat portion 53. Additionally, in the motor 1 with the speed reducer, the brushless motor 2 and the worm gear speed reducer 4 are combined in a posture in which the flat portion of the stator 10 of the brushless motor 2 (the flat portion 11a of the stator housing 11) is parallel to an axial line L2 of the output shaft 100. A cover member (not illustrated) having an external connection connector 31 is fixed to a side surface of the gear housing 23.

Further, a rotation detecting means 9 for detecting a rotation angle of the rotating shaft 3 (rotor 5) is provided inside a connecting portion between the brushless motor 2 and the worm gear speed reducer 4. A motor control portion which is not illustrated controls power supply to the coil 41 by a rotation angle signal of the rotor 5 detected by the rotation detecting means 9 and generates the rotating magnetic field in the stator 10 to rotate the rotor 5.

(Operation and Effect)

Hereinafter, an operation and an effect of the brushless motor 2 of the embodiment will be described with reference to FIGS. 4A to 5C. Further, FIG. 4A is a cross-sectional view of a main part of the brushless motor according to an embodiment using the hexagonal cylindrical stator core, and FIG. 4B is a cross-sectional view of the main part of the brushless motor using a cylindrical stator core of the same size.

Figure 4A:
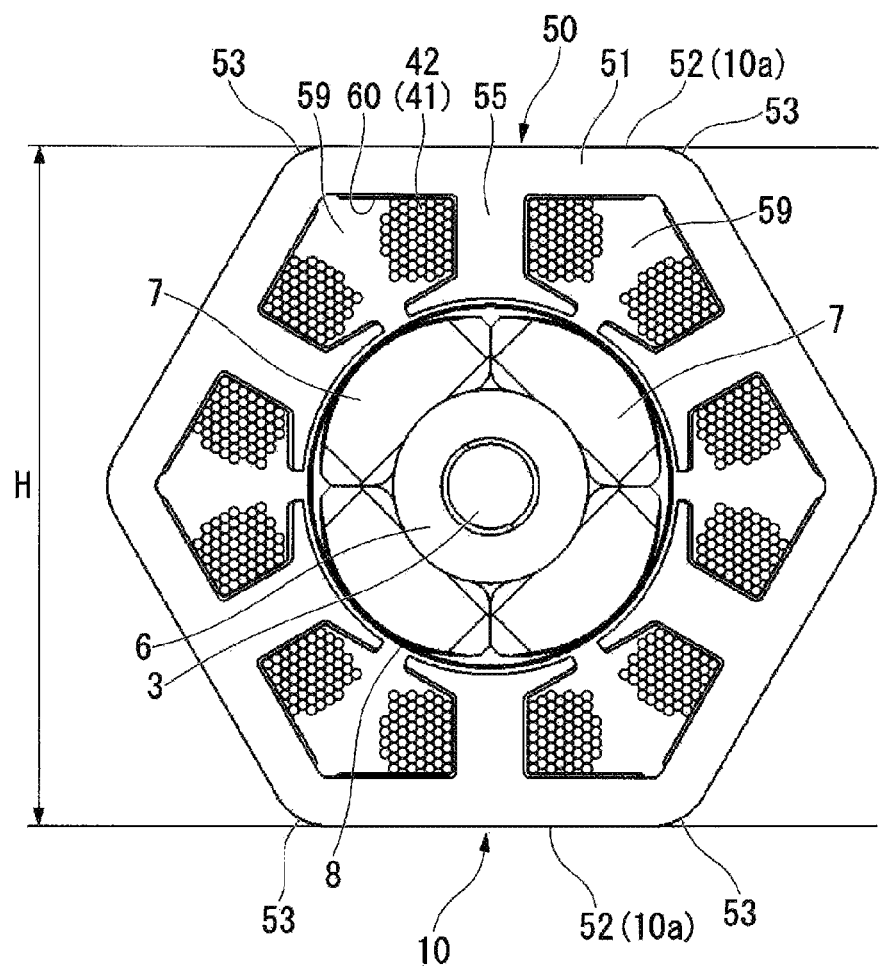
FIG. 4A illustrates a brushless motor according to the embodiment of the disclosure and is a cross-sectional view of a main part of the embodiment using a hexagonal cylindrical stator core.
Figure 4B:
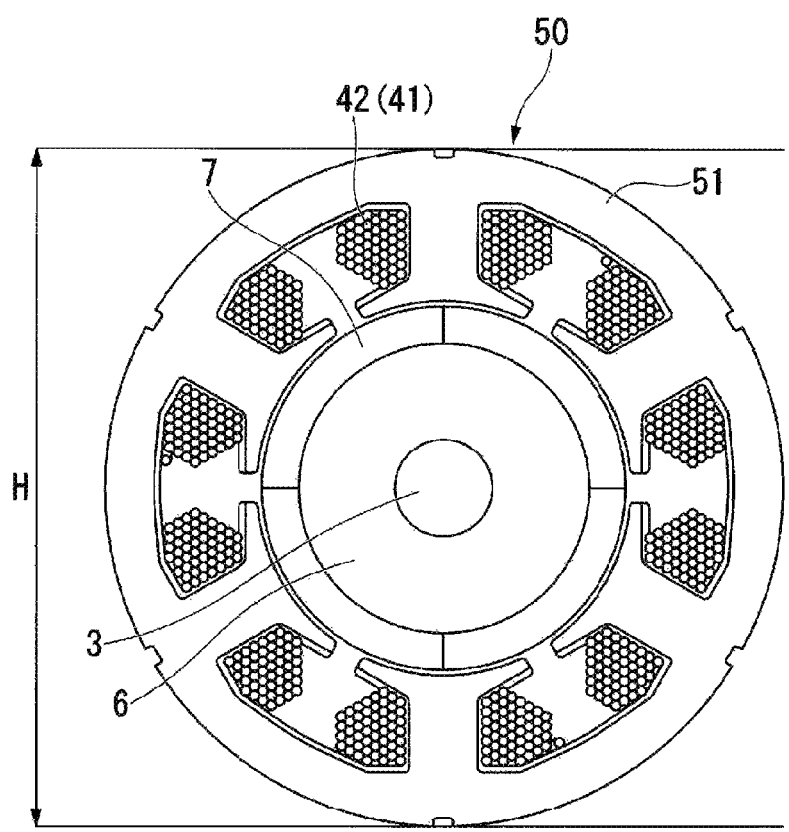
FIG. 4B illustrates the brushless motor according to the embodiment of the disclosure and is a cross-sectional view of a main part of the embodiment using a cylindrical stator core.

As illustrated in FIG. 4A, in the brushless motor 2, since the hexagonal cylindrical stator core 50 is used, it is possible to secure a large storage space (space of the slot 59) of the coil 41 while securing a high permeance coefficient as compared with the case of a comparative example (FIG. 4B) using the cylindrical stator core 50 having the same diameter as a size H of a parallel two-surface width thereof. Therefore, even when the coils 41 having the desired number of windings are accommodated in the slot 59, it is possible to secure a gap, thereby enhancing heat dissipation. Further, density (space factor) of the winding 42 wound around each tooth portion 55 can be increased, and the motor characteristics can be improved while the motor has a small size.

Also, as illustrated in FIG. 5A, by setting the center of curvature TR2 and the radius of curvature R2 of the outer radial surface 71 of each permanent magnet 7 as described above (refer to FIG. 5B), a thickness of both circumferential end portions of the permanent magnet 7 can be set thinner than a thickness of a circumferential center portion thereof, and thus it helps to reduce cogging torque. Furthermore, since the space occupied by the rotor core 6 can be set to be same as the conventional one and the thickness of the permanent magnet 7 in the radial direction can be sufficiently secured, it is possible to obtain desired motor characteristics while preventing the size increase of the rotor 5 even when a ferrite magnet having a small magnetic saturation value is used.

In addition, since the magnetic orientation of each permanent magnet 7 (the direction of the magnetic flux 75) is the parallel orientation, the permeance coefficient can be increased and the effective magnetic flux can be increased as compared with the radial orientation. Therefore, it is possible to enhance motor performance while reducing the size of the brushless motor 2.

Further, using the ferrite magnet as the permanent magnet 7 helps to solve a problem of high temperature demagnetization when a neodymium (rare earth) permanent magnet is used. Also, as compared to the neodymium permanent magnet, manufacturing cost can be reduced. Therefore, it is possible to secure necessary motor characteristics while suppressing a cost increase.

Figure 6:
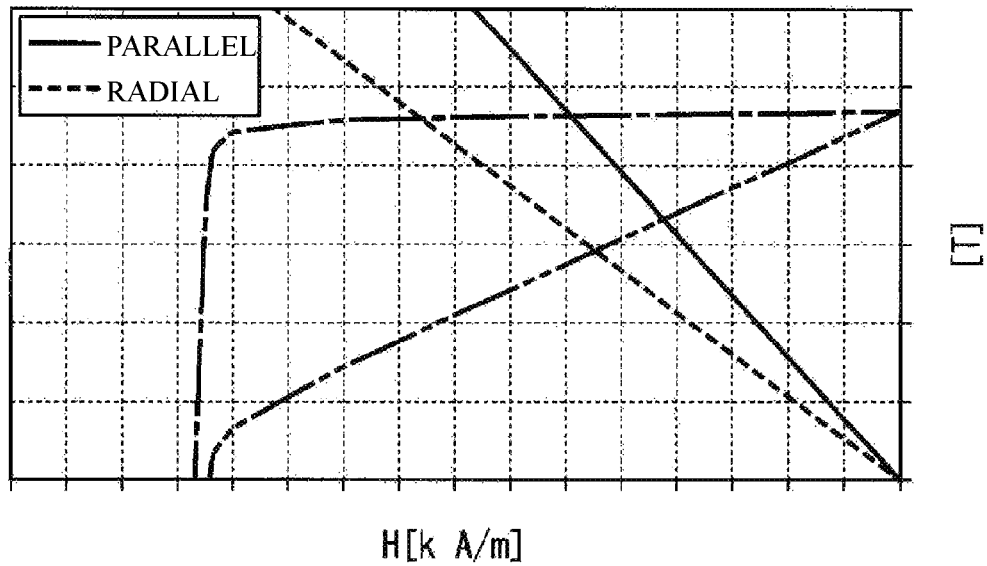
FIG. 6 is a view illustrating a difference in permeance coefficient between a parallel orientation and a radial orientation of the permanent magnet according to the embodiment of the disclosure.
Figure 7:
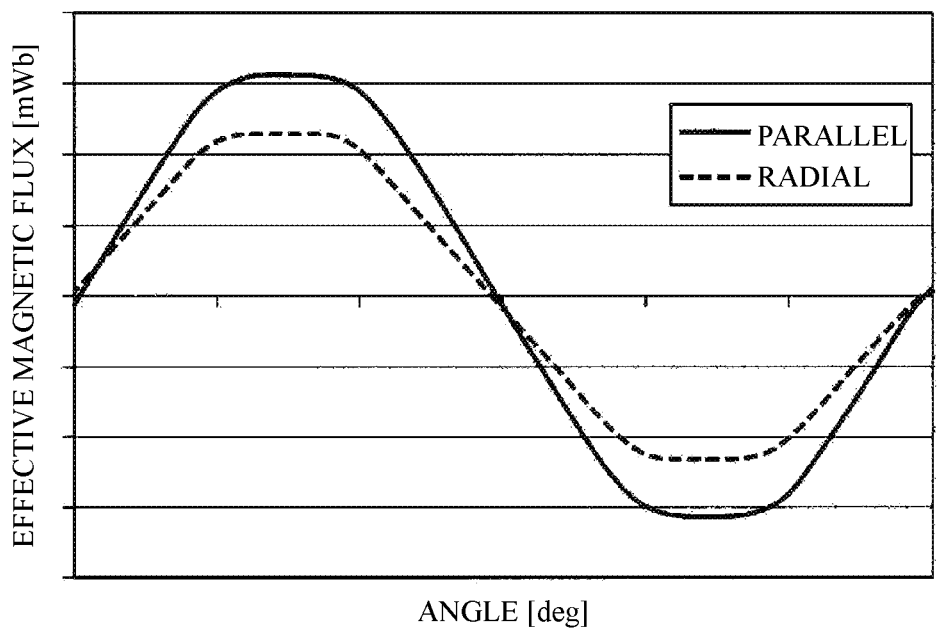
FIG. 7 is a view illustrating a difference in effective magnetic flux waveform between the parallel orientation and the radial orientation of the permanent magnet according to the embodiment of the disclosure.
Figure 8:
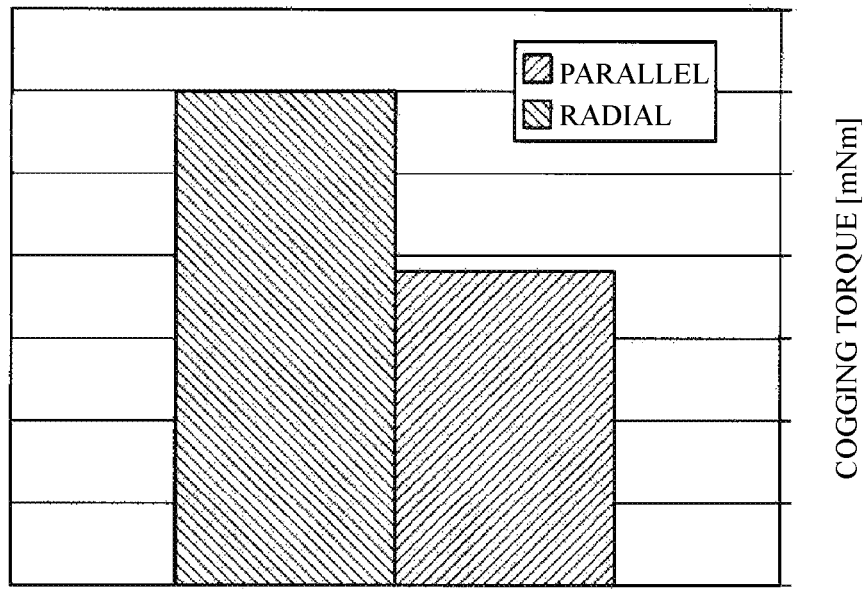
FIG. 8 is a view illustrating a difference in cogging torque between the parallel orientation and the radial orientation of the permanent magnet according to the embodiment of the disclosure.

FIGS. 6 to 8 illustrate comparison results when the orientation of the permanent magnet 7 is changed in the motor having the same magnetic circuit and the same shape (in the case of changing from the radial orientation to the parallel orientation). FIG. 6 is a view illustrating a difference in the permeance coefficient between the parallel orientation and the radial orientation of the permanent magnet, FIG. 7 is a view illustrating a difference in the effective magnetic flux waveform between the parallel orientation and the radial orientation of the permanent magnet, and FIG. 8 is a view illustrating a difference in the cogging torque between the parallel orientation and the radial orientation of the permanent magnet.

As illustrated in FIGS. 6 to 8, the parallel orientation can have a higher permeance coefficient and higher effective magnetic flux than the radial orientation. Further, since the thickness of the circumferential end portions of the permanent magnet 7 is thinner than that of the circumferential center portion thereof, the cogging torque can also be reduced.

Figure 9:
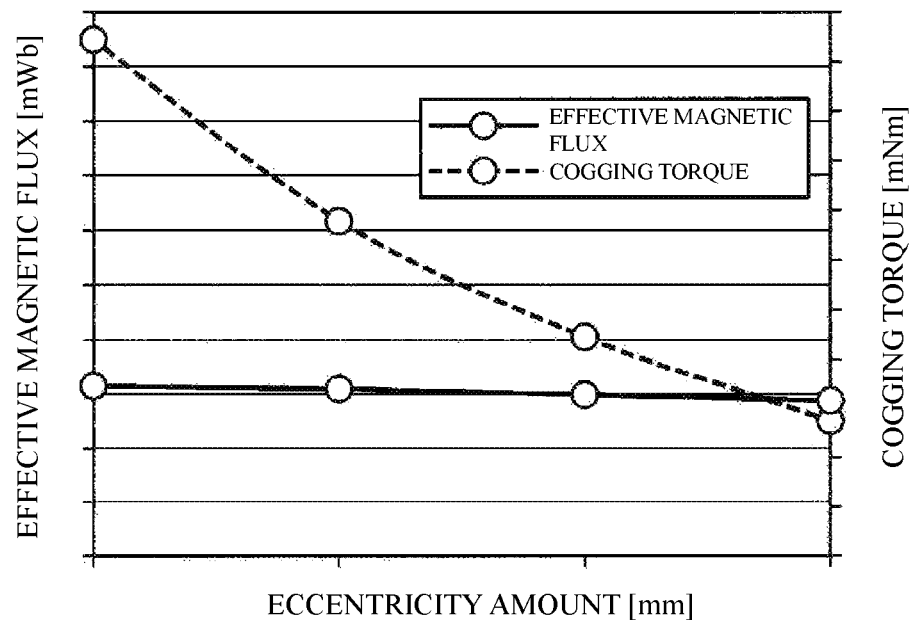
FIG. 9 is a view illustrating a change in the cogging torque and the effective magnetic flux for each eccentricity amount with respect to an axial center of a curvature center of an outer radial surface of the permanent magnet according to the embodiment of the disclosure.
Figure 10:
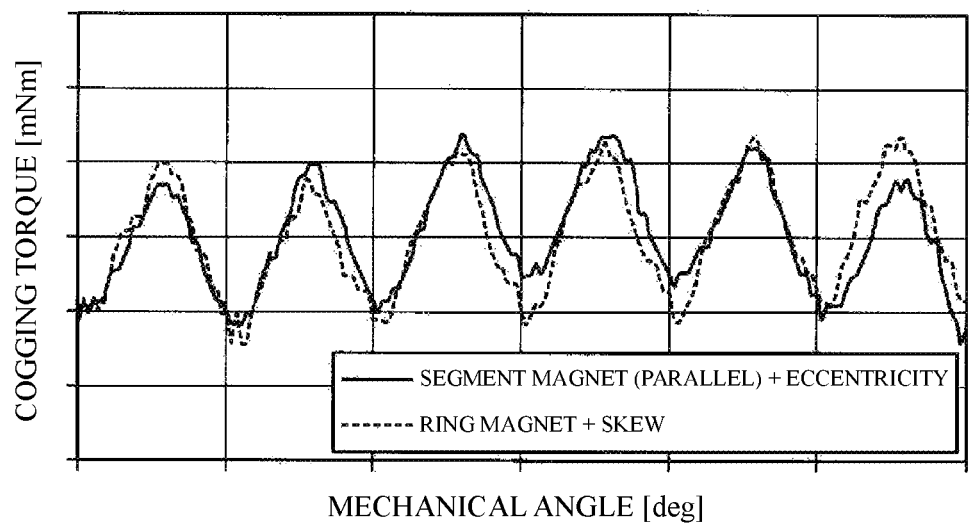
FIG. 10 is a graph comparing the change in the cogging torque of the brushless motor according to the embodiment of the disclosure with a comparative example.

FIG. 9 is a view illustrating changes in the cogging torque and the effective magnetic flux for each eccentricity amount with respect to the axial center L1 of the center of curvature TR2 of the outer radial surface of the permanent magnet, and FIG. 10 is a graph illustrating that the brushless motor (motor which uses the segment type permanent magnet and in which each permanent magnet is in the parallel magnetic orientation and the center of curvature of the outer radial surface is eccentric to the axial center) of the embodiment has substantially the same cogging torque performance as the brushless motor (motor using a skewed ring magnet for the rotor) of the comparative example.

From an analysis result of FIG. 9, it can be understood that, in the magnetic circuit of the present embodiment, by providing the eccentricity amount, it is possible to greatly reduce the togging torque while suppressing a decrease in the effective magnetic flux. Also, in an actual measurement result of FIG. 10, it can be understood that the same result is obtained for "ring magnet+skew" which is a target value.

Further, the term "skew" refers to a state in which it has a torsion angle with respect to the axial direction. That is, in the skewed magnet, a boundary between the magnetic poles (boundary between the N pole and the S pole) is not in the axial direction.

Furthermore, it is possible to prevent separation of the permanent magnet 7, attachment of dust and damage to the permanent magnet 7 by fitting the magnet cover 8 to the outer circumference of the permanent magnet 7. As a fixing method of the magnet cover 8, a method such as press-fitting, adhesion, crimping or the like can be adopted on the outer circumferential surface of the permanent magnet 7.

Also, as illustrated in FIG. 5B, since the maximum thickness A of the permanent magnet 7 in the radial direction is set to be equal to or greater than the thickness of the rotor core 6 in the radial direction, a magnetic field of a magnitude necessary for maintaining the motor performance can be secured while the size of the permanent magnet 7 is minimized.

Moreover, the disclosure is not limited to the above-described embodiments but may include those in which various modified examples are made to the above embodiments within the scope not deviating from the gist of the disclosure.

For example, the stator core 50 in the above-described embodiment may be a laminated core formed by laminating core plates or a dust core.

Further, in the embodiment, a 6-slot brushless motor in which six tooth portions 55 and six coils are formed has been described. However, the disclosure is not limited thereto, and, for example, it may be a 12-slot brushless motor. In this case, the stator may be formed in a polygonal shape having a number of corners corresponding to the number of slots. Also, the number of poles of the rotor 5 may be a number other than the four poles shown in the illustrated example.

First Modified Example

Figure 11:
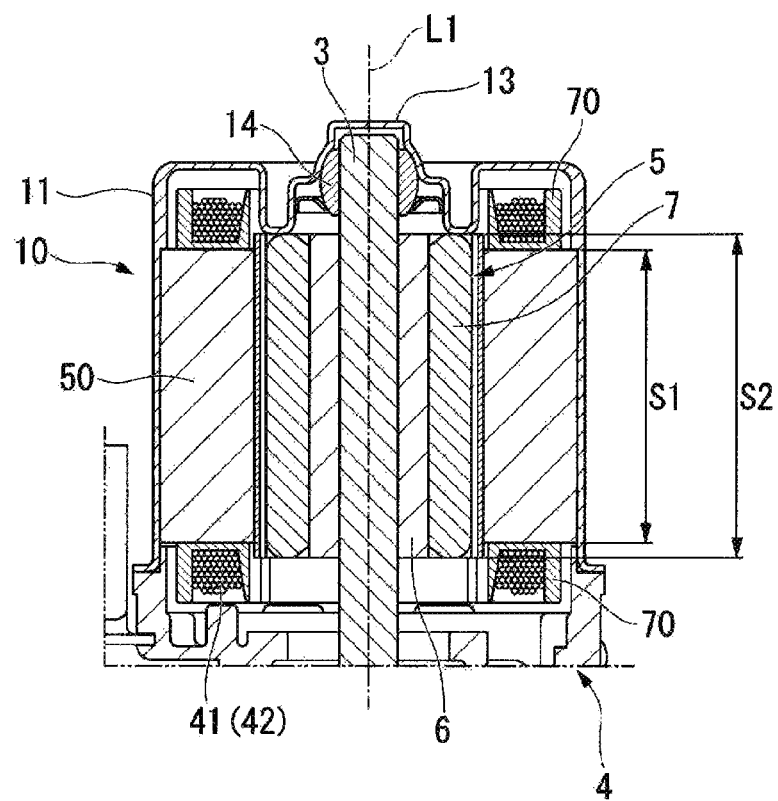
FIG. 11 is a cross-sectional view of a first modified example of the embodiment of the disclosure.

FIG. 11 is a cross-sectional view illustrating a first modified example of the embodiment. Further, in the following drawings, the same reference numerals are given to the same configurations as those of the above-described embodiment, and the description thereof will be omitted.

In the brushless motor illustrated in the drawing, an axial length S2 of the rotor 5 (the rotor core 6 or the permanent magnet 7) is set to be greater than an axial length S1 of the stator core 50. That is, in the case in which the desired effective magnetic flux cannot be obtained even when the maximum thickness dimension A of the permanent magnet 7 in the radial direction is set to the maximum value which can be manufactured, an axial dimension of the rotor 5 extends as in the embodiment of FIG. 11.

In this way, even when the maximum thickness of each permanent magnet 7 in the radial direction is limited, it is possible to secure a magnetic field of a magnitude necessary for maintaining the motor performance.

Second Modified Example

Figure 12:
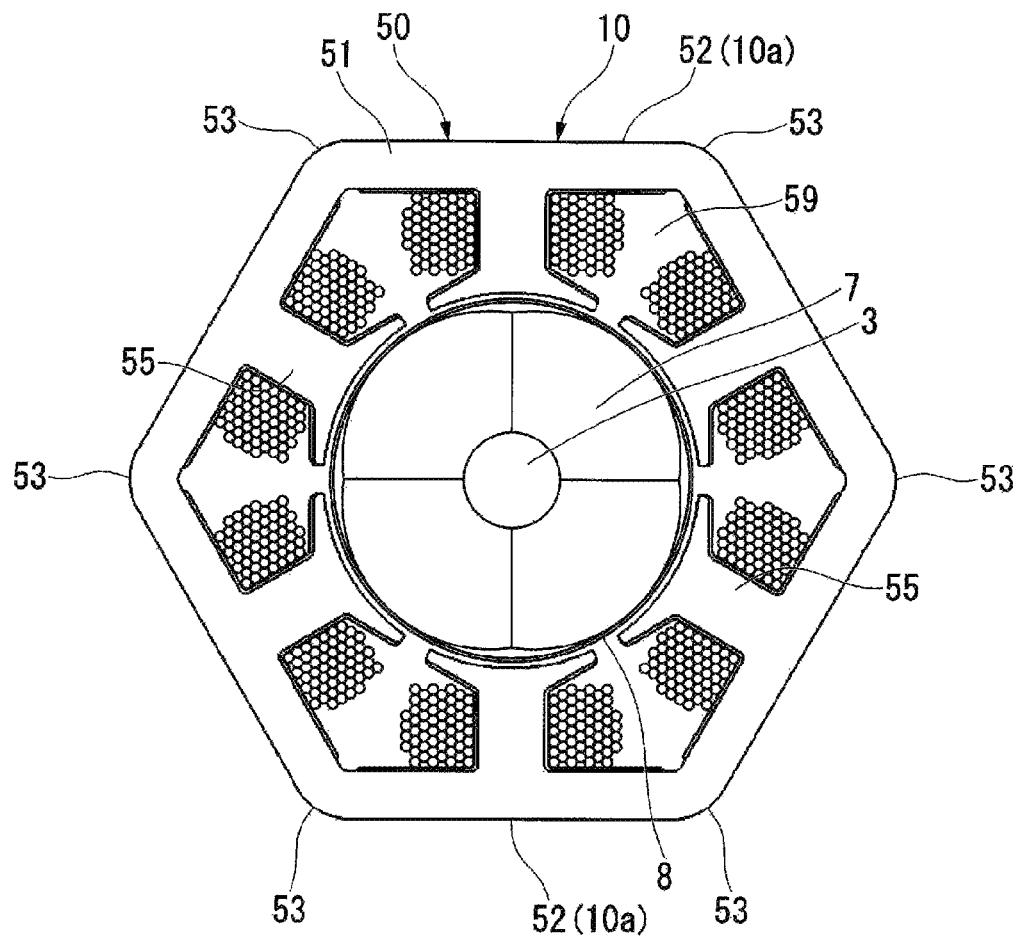
FIG. 12 is a cross-sectional view of a second modified example of the embodiment of the disclosure.

FIG. 12 is a cross-sectional view illustrating a second modified example of the embodiment.

As illustrated in the drawing, when the rotor 5 has a small diameter and the maximum thickness dimension A of the permanent magnet 7 in the radial direction is within the maximum value which can be manufactured, the rotor core may be omitted as in the embodiment of FIG. 12.

INDUSTRIAL APPLICABILITY

According to the above-described brushless motor, since the magnetic orientation of each permanent magnet is the parallel orientation, the permeance coefficient of the permanent magnet can be increased, and thus the effective magnetic flux can be increased as compared with the radial orientation.

Also, by setting the center of curvature and the radius of curvature of the outer radial surface of each permanent magnet as described above, it is possible to efficiently improve the permeance coefficient and the effective magnetic flux of the permanent magnet while suppressing the increase in the size of the permanent magnet. Further, since the thickness of both end portions of the permanent magnet in the circumferential direction can be made thinner than the thickness of the intermediate portion thereof in the circumferential direction, it helps to reduce the cogging torque.

Accordingly, it is possible to improve the motor characteristics while reducing the size and cost of the brushless motor.

The invention claimed is:

1. A brushless motor, which is an inner rotor type brushless motor, comprising:
    a rotating shaft,
    a stator that is cylindrical and concentrically disposed with respect to the rotating shaft and on which a coil is wound, wherein the stator includes a stator core, and the stator core includes a ring yoke portion, wherein the ring yoke portion includes a plurality of flat portions connected to each other, and each two of the flat portions symmetrically disposed at opposite sides of the rotating shaft are mutually parallel,
    wherein an outermost surface of each of the flat portions is a flat surface, and
    a rotor integrally formed with the rotating shaft and disposed on an inner circumferential side of the stator with a gap,
    wherein the rotor includes a plurality of permanent magnets that are segment-typed and formed on an outer circumference of the rotating shaft to have a fan-shaped axial cross section, magnetized from an inner radial surface toward an outer radial surface and disposed at regular intervals so that magnetic poles of the outer radial surfaces are alternately disposed in a circumferential direction, and
    the outer radial surface of each of the permanent magnets has a center of curvature on a line segment connecting a center point of a circumferential width on the outer radial surface and an axial center of the rotating shaft and is formed as a cylindrical surface having a radius of curvature smaller than a distance of the line segment connecting the center point of the circumferential width on the outer radial surface and the axial center of the rotating shaft, and each of the permanent magnets is magnetized in a parallel orientation so that a direction of a magnetized magnetic flux is in parallel with the line segment connecting the center point of the circumferential width on the outer radial surface and the axial center of the rotating shaft,
    wherein a rotor core that is cylindrical is fitted and fixed to the outer circumference of the rotating shaft, the permanent magnets are disposed on an outer circumference of the rotor core, and a maximum thickness of each of the permanent magnets in a radial direction is set to be greater than a maximum thickness of the rotor core in the radial direction.

2. The brushless motor according to claim 1, wherein the ring yoke portion formed in a regular polygonal cylindrical shape and a tooth portion configured to protrude radially inward from a central position of a circumferential width of an inner circumference of each of the plurality of flat portions of the ring yoke portion corresponding to a side of the regular polygonal shape and on which the coil is wound.

3. The brushless motor according to claim 1, wherein each of the permanent magnets is a ferrite magnet.

4. The brushless motor according to claim 1, wherein a cylindrical magnet cover formed of a nonmagnetic material is fitted to outer circumferences of the permanent magnets arranged in the circumferential direction.

5. The brushless motor according to claim 1, wherein an axial length of each of the permanent magnets is set to be longer than an axial length of the stator.

* * * * *